(12) United States Patent
Muro

(10) Patent No.: US 7,152,129 B2
(45) Date of Patent: Dec. 19, 2006

(54) APPARATUS HAVING AN INTER-MODULE DATA TRANSFER CONFIRMING FUNCTION, STORAGE CONTROLLING APPARATUS, AND INTERFACE MODULE FOR THE APPARATUS

(75) Inventor: Tomoharu Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 10/785,232

(22) Filed: Feb. 25, 2004

(65) Prior Publication Data
US 2005/0044283 A1 Feb. 24, 2005

(30) Foreign Application Priority Data
Aug. 22, 2003 (JP) .............. 2003-298203

(51) Int. Cl.
G06F 13/14 (2006.01)
G06F 3/00 (2006.01)
G06F 13/12 (2006.01)

(52) U.S. Cl. .............. 710/305; 710/4; 710/74; 710/300; 710/306; 711/112; 711/114; 711/147

(58) Field of Classification Search .......... 710/4, 710/300, 305, 306, 311; 711/112, 114, 147
See application file for complete search history.

(56) References Cited
U.S. PATENT DOCUMENTS
5,717,420 A * 2/1998 Matsuzaki et al. ........... 345/97

2001/0024448 A1 * 9/2001 Takase et al. ............... 370/428
2003/0197705 A1 * 10/2003 Kawai et al. ............... 345/505
2005/0027878 A1 * 2/2005 Sin et al. .................... 709/237

FOREIGN PATENT DOCUMENTS

| JP | HEI 11-232211 | 8/1999 |
|---|---|---|
| JP | 2000-298640 | 10/2000 |
| JP | 2001-243206 | 9/2001 |
| JP | 2002-140288 | 5/2002 |
| JP | 2002-244994 | 8/2002 |

* cited by examiner

Primary Examiner—Kim Huynh
Assistant Examiner—Jasjit Vidwan
(74) Attorney, Agent, or Firm—Staas & Halsey LLP (57) ABSTRACT

In a storage controlling apparatus controlling an access from a host to a disk apparatus, for example, when a data transfer confirmation flag set in a data transfer descriptor is "ON", a data transfer confirmation descriptor is automatically generated on the basis of transfer information in the data transfer descriptor, data is transferred to a management module according to the data transfer descriptor, and a confirmation code is read out from a bridge module according to the data transfer confirmation descriptor after data transfer to the management module is completed. Whereby, the load on the CPU and the number of PCI accesses are decreased so that the input/output performance is improved.

36 Claims, 7 Drawing Sheets

APPARATUS HAVING AN INTER-MODULE DATA TRANSFER CONFIRMING FUNCTION, STORAGE CONTROLLING APPARATUS, AND INTERFACE MODULE FOR THE APPARATUS

BACKGROUND OF THE INVENTION

1) Field of the Invention

The present invention relates to an apparatus comprising a plurality of modules connected to one another through interface buses such as PCI (Peripheral Component Interconnect) buses or the like, and having a function of confirming data transfer among these modules. More concretely, the present invention relates to a storage controlling apparatus disposed between a physical device (such as a magnetic disk unit) and a host to control an access from the host to the physical device, and interface modules (such as a host interface module, a disk interface module and the like) for use in the storage controlling apparatus.

2) Description of the Related Art

Figure 4:
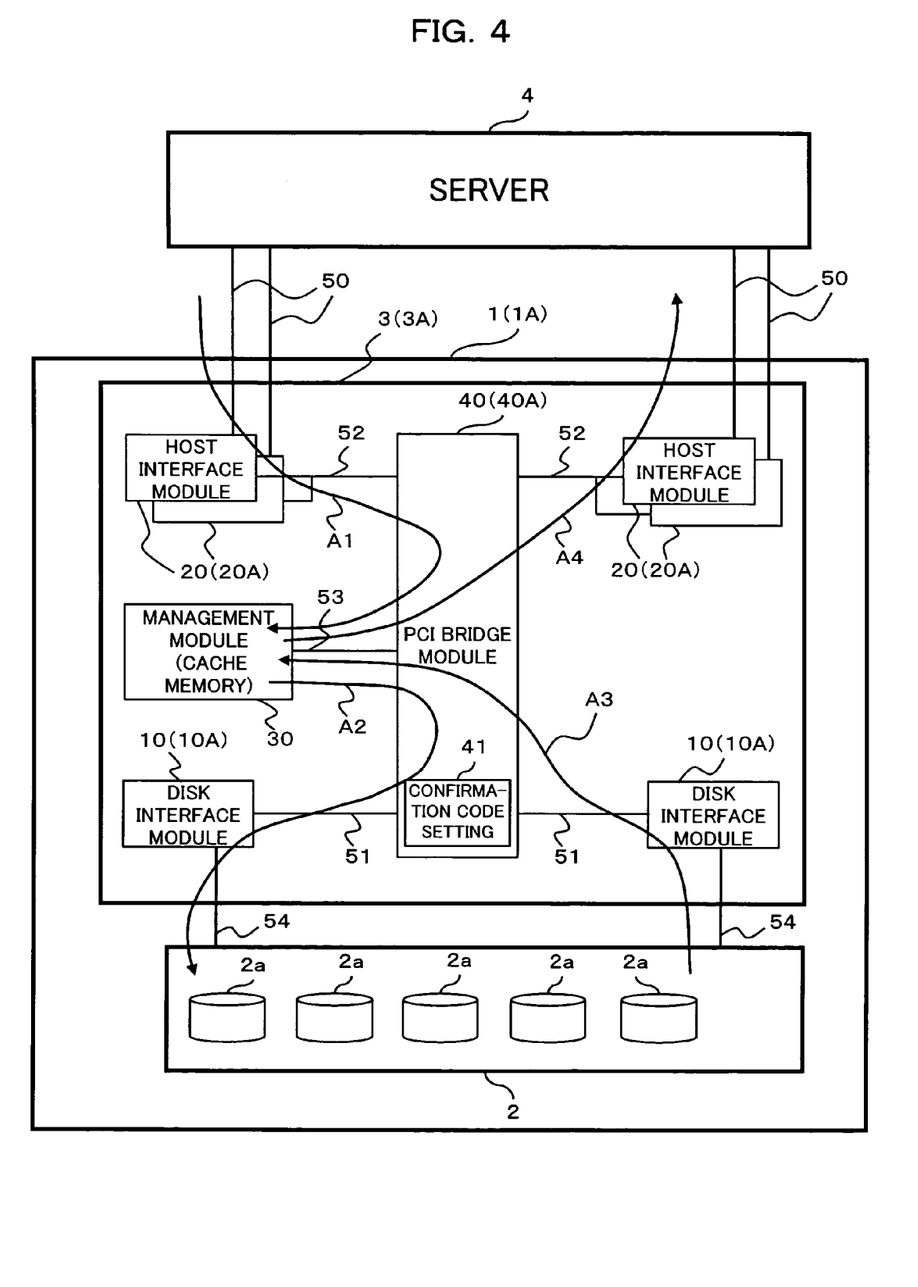
FIG. 4 is a block diagram showing structures of both a known storage apparatus (a storage controlling apparatus) and a storage apparatus (a storage controlling apparatus) according to the embodiment of this invention.

FIG. 4 is a block diagram showing structures of a storage apparatus (a storage controlling apparatus) and for the description of the related art, FIG. 4 is discussed with respect to known structures of the storage apparatus. A storage apparatus 1 shown in FIG. 4 writes data from a server (a host) 4, and reads data requested by the server 4 and transfers the data to the server 4 in response to an access from the server (host) 4.

The storage apparatus 1 comprises a disk enclosure 2 having a plurality of disk units (physical devices) 2a, and a storage controlling apparatus 3 disposed between the disk units 2a and the server 4 to control an access to each of the disk units 2a from the server 4.

The storage controlling apparatus 3 comprises a disk interface module 10, a host interface module 20, a management module 30 and a PCI bridge module 40.

The disk interface module 10 controls an interface (data transfer) with each of the disk units 2a in the disk enclosure 2 through a disk interface bus 54.

The host interface module 20 controls an interface (data transfer) with the server 4 through a fiber channel interface bus 50.

The management module 30 generally manages the whole of the storage controlling apparatus 3. The management module 30 is equipped with a cache memory temporarily storing data to be written from the server 4 into one of the disk units 2a or data to be read out from one of the disk units 2a to the server 4, and manages the cache memory.

To the PCI bridge module 40, the disk interface module 10, the host interface module 20 and the management module 30 are connected through the PCI buses (interface buses) 51, 52 and 53. The PCI bridge module 40 connects the disk interface module 10, the host interface module 20 and the management module 30 to one another so that data can be transferred among them.

With the above structure, data writing from the server 4 into one of the disk units 2a and data reading from one of the disk units 2a to the server 4 are performed as follows.

When data is written from the server 4 into one of the disk units 2a of the disk enclosure 2, data to be written is transferred from the server 4 to the host interface module 20 through the fiber channel interface bus 50, then temporarily stored in the cache memory of the management module 30 via the PCI bridge module 40 through the PCI buses 52 and 53, then stored in the cache memory (refer to an arrow A1 in FIG. 4). After that, the data to be written stored in the cache memory of the management module 30 is transferred to the disk interface module 10 via the PCI bridge module 40 through the PCI buses 53 and 51, and written in the predetermined disk unit 2a from the disk interface module 10 through the disk interface bus 54 (refer to an arrow A2 in FIG. 4).

Conversely, when data is read out from one of the disk units 2a of the disk enclosure 2 to the server 4, data to be read is transferred from the disk unit 2a retaining the data to the disk interface module 10 through the disk interface bus 54, then temporarily stored from the disk interface module 10 in the cash memory of the management module 30 via the PCI bridge module 40 through the PCI buses 51 and 53 (refer to an arrow A3 in FIG. 4). After that, the data to be read stored in the cache memory of the management module 30 is transferred to the host interface module 20 via the PCI bridge module 40 through the PCI buses 53 and 52, then read out to the server 4 from the host interface module 20 through the fiber channel interface bus 50 (refer to an arrow A4 in FIG. 4).

Next, description will be made of structures of the disk interface module 10 and the host interface module 20 in the storage controlling apparatus 3 shown in FIG. 4, with reference to a block diagram shown in FIG. 5. The disk interface module 10 and the host interface module 20 have basically the same structure. However, the host interface module 20 differs from the disk interface module 10 in that the host interface module 20 has a function of converting an optical signal from the fiber channel interface bus 50 into an electric signal, and a function of converting an electric signal in the host interface module 10 into an optical signal and sending the optical signal to the fiber channel interface bus 50, while the disk interface module 10 does not have these functions.

Figure 5:
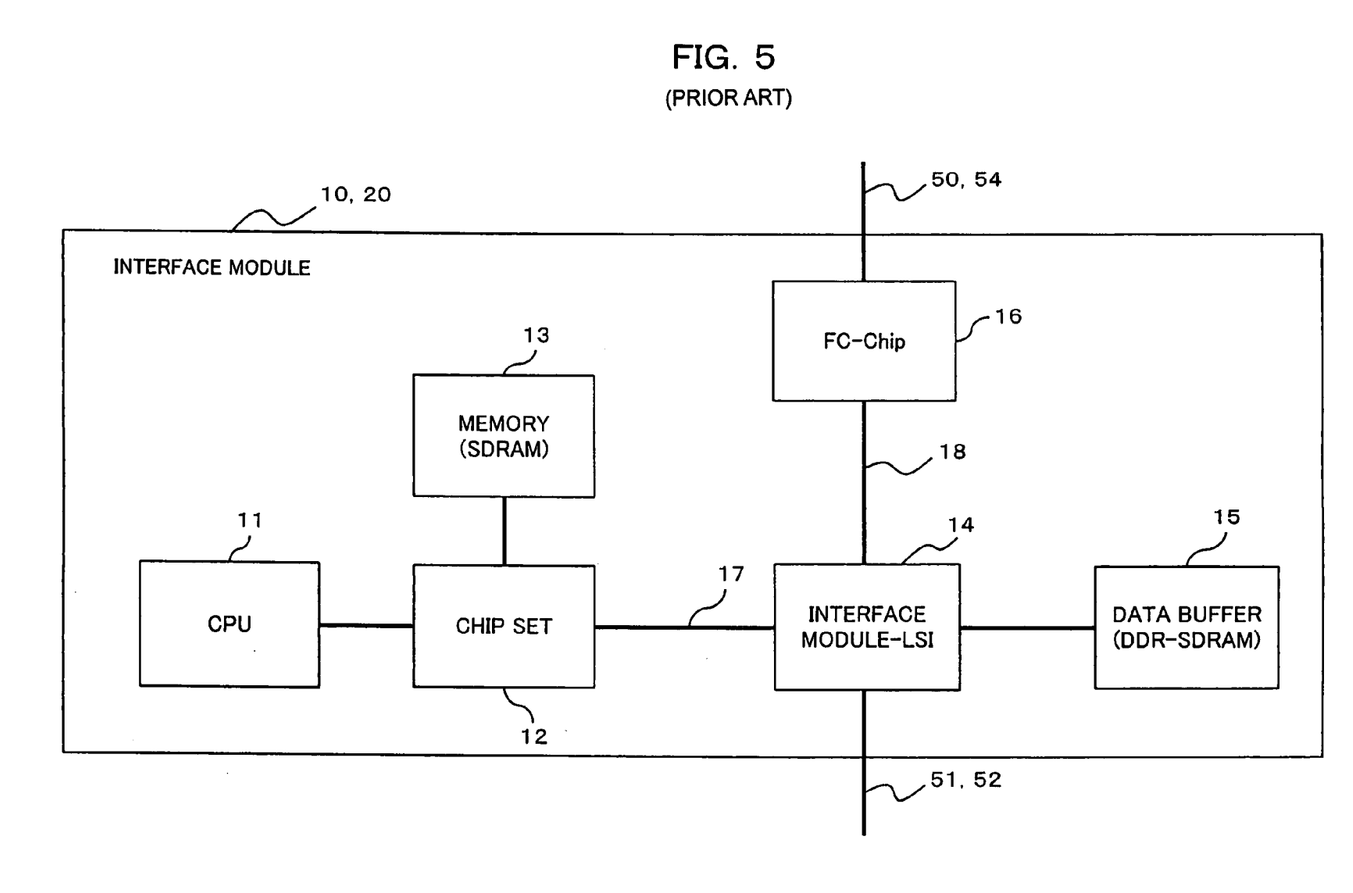
FIG. 5 is a block diagram showing a structure of a interface module for the known storage controlling apparatus.

As shown in FIG. 5, each of the disk interface module 10 and the host interface module 20 (hereinafter, simply referred as the interface modules 10 and 20 occasionally) comprises a CPU 11, a chip set 12, a memory 13, an interface module-LSI 14, a data buffer 15 and a fiber channel chip 16.

The CPU (Central Processing Unit) 11 functions as a first processing unit generally managing the interface module 10 or 20.

The chip set 12 has a function of connecting the CPU 11 to another device (for example, the memory 13) and a function of connecting the CPU 11 to the PCI bus 17. The CPU 11 is connected to the memory 13 via the chip set 12, and is also connected to the interface module-LSI 14 via the chip set 12 through the PCI bus 17. The memory 13 is configured with, for example, an SDRAM (Synchronous Dynamic Random Access Memory).

The interface module-LSI (Large Scale Integration) 14 functions as a second processing unit (a second transfer processing unit) controlling data transfer between the interface module 10 or 20, and the PCI bridge module 40 through the PCI bus 51 or 52. The interface module-LSI 14 is provided with the data buffer 15.

The data buffer 15 is configured with, for example, a DDR (Double Data Rate)-SDRAM, for example. The data buffer 15 temporarily stores data to be transferred to the PCI bridge module 40 and data transferred from the PCI bridge module 40.

To the interface module-LSI 14, the PCI bridge module 40 is connected through the PCI bus 51 or 52, the chip set 12 is connected through the PCI bus (interface bus) 17, and the fiber channel chip 16 is connected through the PCI bus (interface bus) 18.

The interface module-LSI 14 has a function being as a DMAC (Direct Memory Access Controller; controlling means). As will be described later with reference to FIGS. 6 and 7, the CPU 11 normally runs a predetermined control program to set a descriptor in the DMAC in the interface module-LSI 14, thereby to make the interface module-LSI 14 execute data transfer or reading of a confirmation code (AA code).

The fiber channel chip (FC-Chip) 16 functions as a first transfer processing unit controlling data transfer between the interface module 10 or 20, and each of the disk units 2a or the server 4 through the fiber channel interface bus 50 or the disk interface bus 54.

When the interface module 10 or 20 transfers data to the cache memory of the management module 30, the data is transferred via the PCI bridge module 40 through the PCI buses 51 or 52, and 53 as described above with reference to FIG. 4. At this time, the interface module 10 or 20 can confirm whether the data is normally transferred to the PCI bridge module 40 through the PCI bus 51 or 52, but cannot confirm whether the data is normally transferred from the PCI bridge module 40 to the management module 30. Since this is a problem in a system required reliability, it is necessary that the interface module 10 or 20 can confirm whether the data is normally transferred from the PCI bridge module 40 to the management module 30.

In Japanese Patent Laid-Open Publication No 2001-243206, there is proposed a technique of performing normal end confirmation (AA: Access Assurance) of PCI-transfer from the PCI bridge module 40 to the management module 30. In order to realize this technique, the PCI bridge module 40 has a function being as a confirmation code setting means 41 (refer to FIG. 4). The confirmation code setting means 41 sets, in the PCI bridge module 40, a confirmation code (AA code) for confirming data transfer from the PCI bridge module 40 to the management module 30 when the interface module 10 or 20 transfers data to the management module 30 via the PCI bridge module 40 through the PCI buses 51 or 52, and 53. The interface, module 10 or 20 determines whether or not the data transfer from the PCI bridge module 40 to the management module 30 has been normally carried out by reading out the above confirmation code from the PCI bridge module 40 after the data transfer, and carries out a process (normal end or data re-transfer) according to a result of the determination.

Hereinafter, the above technique will be described in more detail with reference to FIGS. 6 and 7.

First, description will be made of an operation at the time of normal data transfer of the storage controlling apparatus 3 described above, with reference to a sequence diagram (steps S11 through S35) shown in FIG. 6. When staring data transfer, the CPU 11 sets, in the interface module-LSI 14 (DMAC), a descriptor for data transfer and a descriptor for confirmation code reading (data transfer confirmation descriptor) for each data unit (data block) to be transferred (set DSCs: step S11), and starts the DMA (step S12).

Here, the descriptor (DSC) has a set of information required at the time of DMA transfer. The descriptor for data transfer contains transfer information (for example, transfer length, transfer origin address, transfer destination address, and other additional information) required for data transfer to the management module 30. The descriptor for confirmation code reading contains confirmation code reading information (for example, transfer length, transfer origin address, transfer destination address and other additional information) required to read the confirmation code from the PCI bridge module 40 to the interface module 10 or 20.

Figure 6:
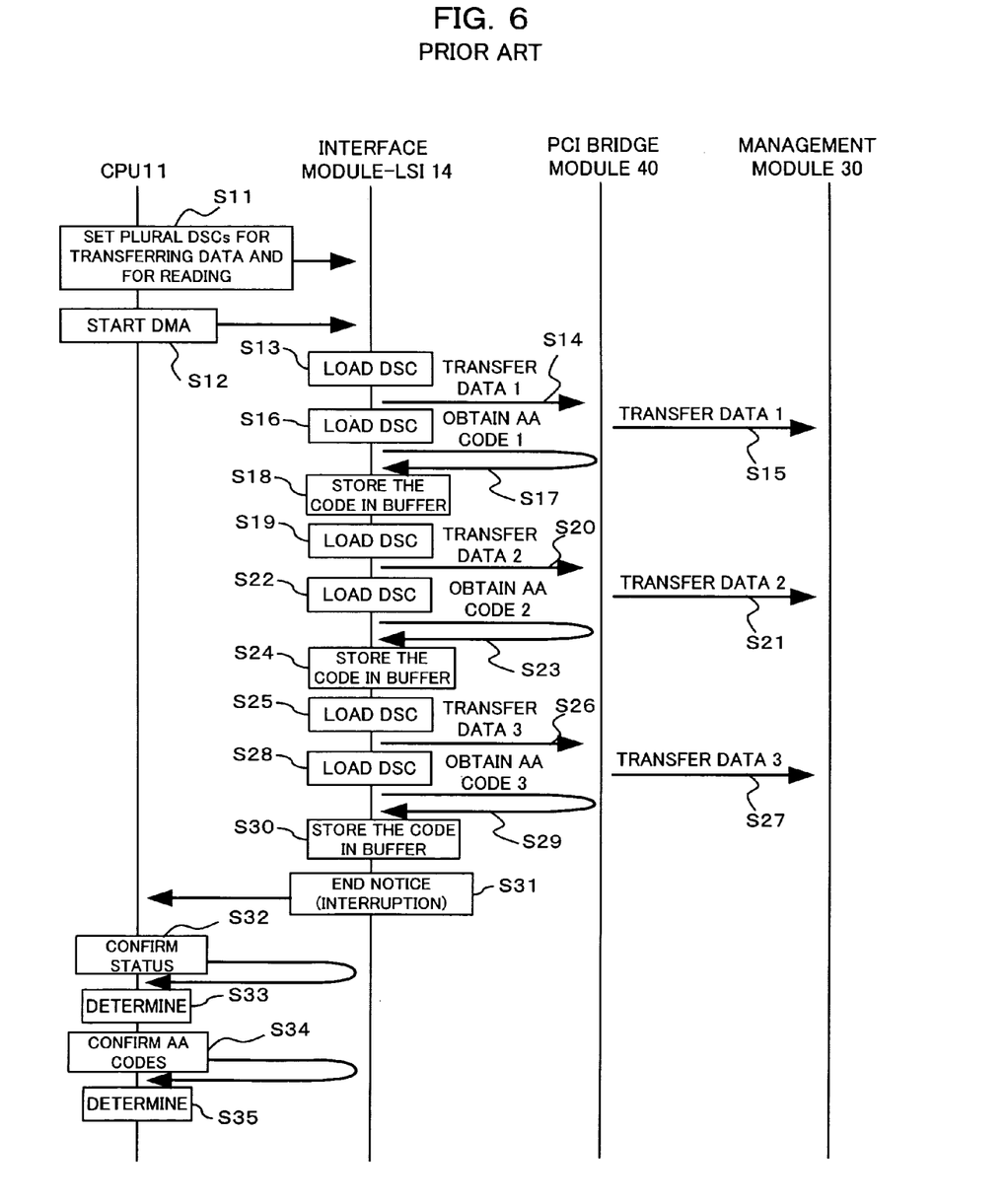
FIG. 6 is a sequence diagram for illustrating an operation of the known storage controlling apparatus at the time of normal data transfer.
Figure 7:
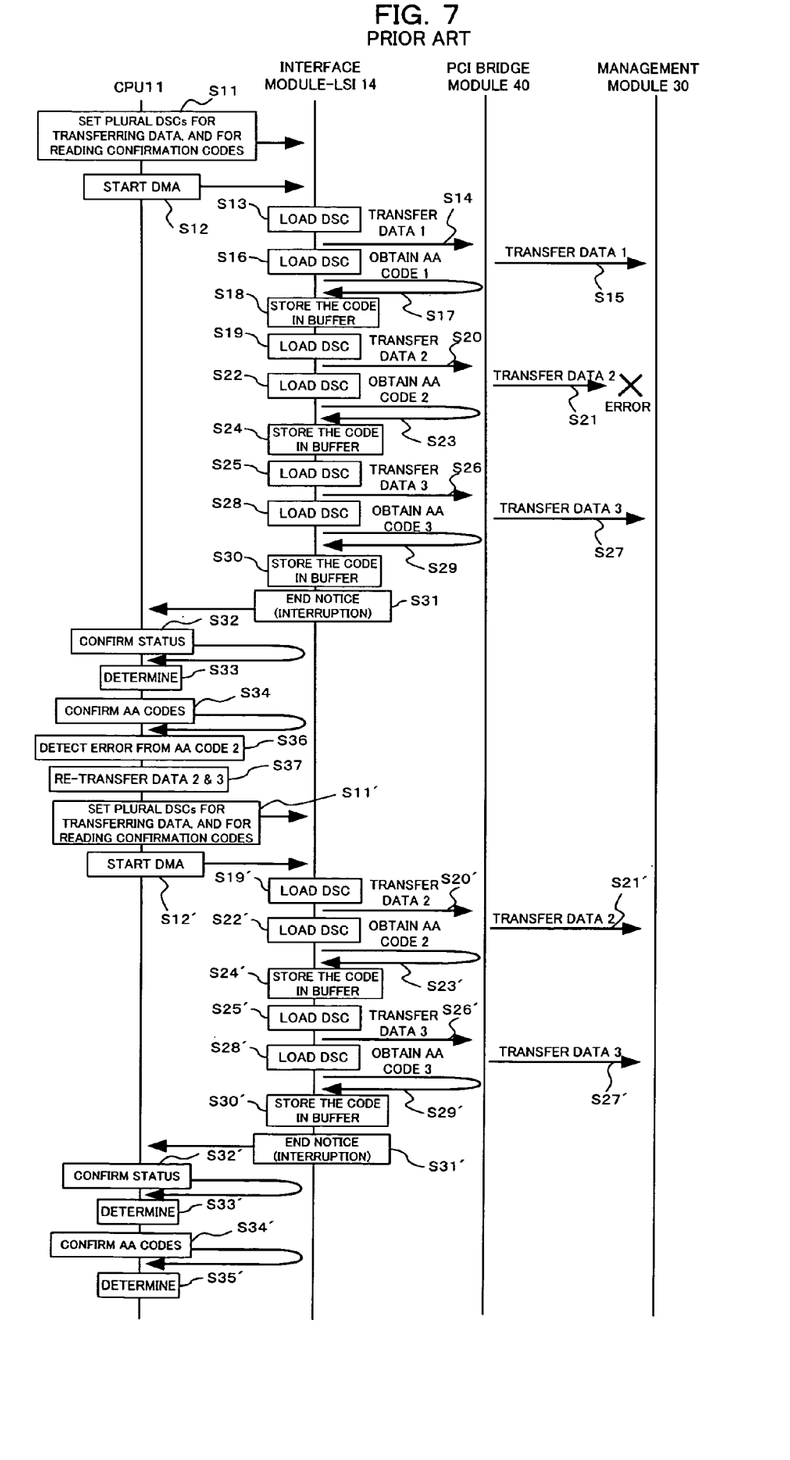
FIG. 7 is a sequence diagram for illustrating an operation of the known storage controlling apparatus at the time of abnormal data transfer.

FIGS. 6 and 7 show an example in which three data units (data 1, 2 and 3) are successively transferred. In this case, it is necessary to set three descriptors for data transfer and three descriptors for confirmation code reading at step S11.

The interface module-LSI 14 in which the descriptors are set and the DMA is started by the CPU 11 is loaded the descriptor for data transfer for each data unit (load DSC; steps S13, S19 and S25). The data is transferred from the interface module-LSI 14 to the management module 30 via the PCI bridge module 40 according to the loaded descriptor for data transfer (steps S14, S15, S20, S21, S26 and S27). When the data transfer is completed, the descriptor for confirmation code reading is successively loaded (step S16, S22 and S28). The confirmation code (AA codes 1, 2 or 3) for the data is obtained from the PCI bridge module 40 according to the loaded descriptor for confirmation code reading (steps S17, S23 and S29) and stored in the data buffer 15 (steps S18, S24 and S30)

When transfer of the three data units is completed, an end notice (interruption) is sent from the interface module-LSI 14 to the CPU 11 (step S31). When receiving the end notice, the CPU 11 reads out a status from the interface module-LSI 14 (step S32), and determines on the basis of the status whether the data transfer between the interface module 10 or 20 and the PCI bridge module 40 has been carried out normally or abnormally (step S33). When it is determined at step S32 that the data transfer has been carried out normally, the CPU 11 reads out the confirmation codes from the interface module-LSI 14 (data buffer 15) (step S34), and determines on the basis of the confirmation codes whether the data transfer between the PCI bridge module 40 and the management module 30 has been carried out normally or abnormally (step S35). The sequence diagram shown in FIG. 6 shows an operation of the storage controlling apparatus 3 performed when the data transfer has been carried out normally. At step S35, it is determined that the data transfer has been carried out normally, and a series of data transfer is completed.

Next, description will be made of an operation of the storage controlling apparatus 3 performed when abnormality occurs, with reference to a sequence diagram (steps S11 through S34, S36, S37, S11', S12', and S19' through S35') shown in FIG. 7. In FIG. 7, at steps designated by like reference characters, like or corresponding processes are carried out, detailed description of which are thus omitted. In FIG. 7, "'" is attached to the reference character of a step at which data is re-transferred.

In an example shown in FIG. 7, three data units are transferred and confirmation codes are obtained in a procedure (steps S11 through S34) similar to that shown in FIG. 6. However, in the example shown in FIG. 7, a transfer error occurs between the PCI bridge module 40 and the management module 30 when the second data 2 is transferred, and the transfer of the data 2 is abnormally terminated.

When determining on the basis of a confirmation code read out from the interface module-LSI 14 (data buffer 15) at step S34 that the data transfer has been carried out abnormally, the CPU 11 detects contents of the error from the confirmation code (AA code 2) (step S36), confirms a transfer error of the data 2, and executes re-transfer of data units after the second and the later data units (here, two data 2 and 3) (step S37).

When re-transferring, the CPU 11 again sets, in the interface module-LSI 14 (DMAC), descriptors for data transfer and descriptors for confirmation code reading for the two data 2 and 3 to be re-transferred (step S11'), and starts the DMA (step S12'). Like the procedure (steps S19 through S30) shown in FIG. 6, the data 2 and 3 are transferred and the confirmation codes (AA codes 2 and 3) are obtained and stored (steps S19' through S30').

When re-transfer of the two data units is completed as above, a process (end notice, reading of a status and confirmation codes, determination of normality/abnormality; steps S31' through S35') similar to the process at steps S31 through S35 is executed. When it is determined at step S35' that the data transfer has been carried out normally, a series of data transfer is completed.

In the technique shown in FIGS. 6 and 7, the CPU 11 has to set two kinds of descriptors (for data transfer and for confirmation code reading) for each data unit to be transferred, and execute both determinations of whether data has been transferred normally or abnormally between the interface module 10 or 20 and the PCI bridge module 40, and whether data has been transferred normally or abnormally between the PCI bridge module 40 and the management module 30.

With an increase in data transfer quantity from the host (server) 4 in these years, it is a large load on the CPU 11 to set a descriptor for confirmation code reading for each data unit, thus a PCI access takes a longer time. Additionally, the process of setting the descriptor for confirmation code reading becomes a large overhead, which causes a degradation of the input/output performance.

The CPU 11 executes all the normal/abnormal determinations, which is a large load on the CPU 11. For this, the PCI access takes a longer time, thus the determining process becomes a large overhead, which results in degradation of the input/output performance.

SUMMARY OF THE INVENTION

In the light of the above problems, an object of the present invention is to automatically generate a descriptor for confirmation code reading, thereby to omit the process of setting the descriptor for confirmation code setting. Whereby, it becomes possible to decrease the load on the CPU and the number of PCI accesses to realize improvement of the input/output performance. Another object of the present invention is to disperse determinations of whether data has been carried out normally or abnormally and execute the determinations, and to collect an abnormal status at the time of confirmation of whether or not data has been carried out normally without a load on the program. Whereby, it becomes possible to further decrease the load on the CPU and the number of PCI accesses, and improve the input/output performance.

Therefore, the present invention provides an apparatus having an inter-module data transfer confirming function comprising a first module, a second module, a bridge module connected the first module and the second module through interface buses to connect the first module and the second module to each other so that data can be transferred between the first module and the second module, and a confirmation code setting means for setting, in the bridge module, a confirmation code for confirming data transfer from the bridge module to the second module when the first module transfers data to the second module via the bridge module through the interface buses, the first module comprising a descriptor setting means for setting a data transfer descriptor containing transfer information required for data transfer to the second module and a data transfer confirmation flag, a descriptor generating means for automatically generating, when the data transfer confirmation flag is "ON", a data transfer confirmation descriptor containing confirmation code reading information, which is required to read out the confirmation code from the bridge module to the first module, on the basis of the transfer information in the data transfer descriptor set by the descriptor setting means, and a controlling means for controlling data transfer to the second module according to the transfer information in the data transfer descriptor set by the descriptor setting means, and for controlling, when the data transfer confirmation flag is "ON", after the data transfer to the second module is completed, reading of the confirmation code from the bridge module according to the confirmation code reading information in the data transfer confirmation descriptor automatically generated by the descriptor generating means.

The first module may comprise a first processing unit for generally managing the first module, and a second processing unit for carrying out data transfer through the interface buses according to an instruction from the first processing unit, the first processing unit fulfilling a function as the descriptor setting means, and the second processing unit fulfilling functions as the descriptor generating means and the controlling means.

The first module may further comprise a first determining means for determining whether data transfer between the bridge module and the second module has been carried out normally or abnormally, on the basis of the confirmation code read out from the bridge module, and a second determining means for determining whether data transfer between the first module and the bridge module has been carried out normally or abnormally. At this time, when the first determining means determines that the data transfer has been carried out abnormally, the descriptor generating means may automatically generate an error reading descriptor containing error reading information required to read out detailed error information from the bridge module to the first module, and the controlling means may control reading of the detailed error information from the bridge module according to the error reading information in the error reading descriptor automatically generated by the descriptor generating means. The first module may comprise a first processing unit for generally managing the first module, and a second processing unit for carrying out data transfer through the interface buses according to an instruction from the first processing unit, the first processing unit fulfilling functions as the descriptor setting means and the second determining means, and the second processing unit fulfilling functions as the descriptor generating means, the controlling means and the first determining means. When the second determining means determining that the data transfer has been carried out abnormally, the first processing unit may obtain, from the second processing unit, the detailed error information read out from the bridge module, and instruct the second processing unit to re-transfer the data on the basis of the detailed error information.

When a plurality of data blocks are successively transferred from the first module to the second module, the descriptor setting means may set only the data transfer confirmation flag in a data transfer descriptor for transferring the last data block among the plurality of data blocks to "ON".

In the above apparatus, the interface bus may be a PCI bus. The data transfer between the first module and the second module may be DMA transfer controlled by the controlling means. The descriptor set by the descriptor setting means and the descriptor automatically generated by the descriptor generating means may be descriptors having a set of information required for the DMA transfer.

The present invention further provides a storage controlling apparatus disposed between a disk unit and a host to control an access to the disk unit from the host, the storage controlling apparatus comprising a disk interface module for controlling an interface with the disk unit, a host interface module for controlling an interface with the host, a management module for generally managing the whole of the apparatus, a bridge module connected the disk interface module, the host interface module and the management module through interface buses to connect the disk interface module, the host interface module and the management module to one another so that data can be transferred among the disk interface module, the host interface module and the management module, and a confirmation code setting means for setting, in the bridge module, a confirmation code for confirming data transfer from the bridge module to the management module when the disk interface module or the host interface module transfers data to the management module via the bridge module through the interface buses, the disk interface module and/or the host interface module (hereinafter referred simply as the interface module) comprising a descriptor setting means for setting a data transfer descriptor containing transfer information required for data transfer to the management module and a data transfer confirmation flag, a descriptor generating means for automatically generating, when the data transfer confirmation flag is "ON", a data transfer confirmation descriptor containing a confirmation code reading information, which is required to read out the aid confirmation code from the bridge module to the interface module, on the basis of the transfer information in the data transfer descriptor set by the descriptor setting means, and a controlling means for controlling data transfer to the management module according to the transfer information in the data transfer descriptor set by the descriptor setting means, and for controlling, when the data transfer confirmation flag is "ON", after the data transfer to the management module is completed, reading of the confirmation code from the bridge module according to the confirmation code reading information in the data transfer confirmation descriptor automatically generated by the descriptor generating means.

The interface module may comprise a first processing unit for generally managing the interface module, and a second processing unit for carrying out data transfer through the interface buses according to an instruction from the first processing unit, the first processing unit fulfilling a function as the descriptor setting means, and the second processing unit fulfilling functions as the descriptor generating means and the controlling means.

The interface module may further comprise a first determining means for determining, on the basis of the confirmation code read out from the bridge module, whether data transfer between the bridge module and the management module has been carried out normally or abnormally, and a second determining means for determining whether data transfer between the interface module and the bridge module has been carried out normally or abnormally. At this time, when the first determining means determines that the data transfer has been carried out abnormally, the descriptor generating means may automatically generate an error reading descriptor containing error reading information required to read out detailed error information from the bridge module to the interface module, and the controlling means may control reading of the detailed error information from the bridge module according to the error reading information in the error reading descriptor automatically generated by the descriptor generating means. The interface module may comprise a first processing unit for generally managing the interface module, and a second processing unit for carrying out data transfer through the interface buses according to an instruction from the first processing unit, the first processing unit fulfilling functions as the aid descriptor setting means and the second determining unit, and the second processing unit fulfilling functions as the descriptor generating means, the controlling means and the first determining means. When the second determining unit determines that the data transfer has been carried out abnormally, the first processing unit may obtain, from the second processing unit, the detailed error information read out from the bridge module, and instruct the second processing unit to re-transfer the data on the basis of the detailed error information.

When a plurality of data blocks are successively transferred from the interface module to the management module, the descriptor setting means may set only the data transfer confirmation flag in a data transfer descriptor for transferring the last data block among the plurality of data blocks to "ON".

In the above storage controlling apparatus, the interface buses may be PCI buses. The data transfer between the interface module and the management module may be carried out as DMA transfer controlled by the controlling means. The descriptor set by the descriptor setting means and the descriptor automatically generated by the descriptor generating means may be descriptors having a set of information required for DMA transfer.

The interface module for a storage controlling apparatus according to this invention is used in the above storage controlling apparatus, which has a similar structure to that of the interface module in the above storage controlling apparatus.

According to this invention, in the apparatus having an inter-module data transfer confirming function, the storage controlling apparatus, and the interface module for the apparatus, when the data transfer confirmation flag set in a data transfer descriptor is "ON", a data transfer confirmation descriptor is automatically generated on the basis of transfer information in the data transfer descriptor, and data transfer to the management module (second module) is carried out according to the data transfer descriptor. After the data transfer to the management module is completed, a confirmation code is read out from the bridge module according to the data transfer confirmation descriptor. It is thus possible to omit the process of setting a descriptor for confirmation code reading, which is heretofore carried out. Whereby, the load on the CPU and the number of PCI accesses are largely decreased, and the input/output performance is largely improved.

Two kinds of determinations of whether data transfer has been carried out normally or abnormally are executed in the first processing unit and the second processing unit, respectively. When an error occurs, an error reading descriptor is automatically generated, and detailed error information is read out from the bridge module according to the error reading descriptor so that collection of an abnormal status at the time of confirmation of whether the data transfer has been carried out normally can be carried out without a load on the program. It is thus possible to further decrease the load on the CPU and the number of PCI accesses, and improve the input/output performance.

DESCRIPTION OF THE PREFERRED EMBODIMENTS

Hereinafter, description will be made of an embodiment of the present invention with reference to the drawings.

For the description of the preferred embodiments, FIG. 4 is discussed with respect to storage apparatus structures according to an embodiment of the present invention and the embodiment storage apparatus structures are denoted by reference numbers including the character "A." In FIG. 4, a storage apparatus 1A according to an embodiment of this invention has basically almost a similar structure to that of the known structures of the storage apparatus 1. The storage apparatus 1A according to this embodiment writes data from a server 4, or reads data requested by a server 4 and transfers the data to the server 4, in response to an access from the server (host) 4. The storage apparatus 1A comprises a disk enclosure 2 having a plurality of disk units (physical devices) 2a, and a storage controlling apparatus 3A disposed between the disk units 2a and the server 4 to control an access from the server 4 to each of the disk unit 2a.

Almost like the known storage controlling apparatus 3, the storage controlling apparatus 3A according to this embodiment comprises, basically, a disk interface module 10A, a host interface module 20A, a management module 30 and a PCI bridge module 40A, as shown in FIG. 4.

The disk interface module (first module) 10A controls an interface (data transfer) with each of the disk units 2a in the disk enclosure 2 through a disk interface bus 54.

The host interface module (first module) 20A controls an interface (data transfer) with the server 4 through a fiber channel interface bus 50.

The management module (second module) 30 generally manages the whole of the storage controlling apparatus 3A. The management module 30 is equipped with a cache memory temporarily storing data to be written into one of the disk units 2a from the server 4 or data to be read out from one of the disk units 2a to the server 4, and manages the cache memory.

The disk interface module 10A, the host interface module 20A and the management module 30 are connected to the PCI bridge module (bridge module) 40A through PCI buses (interface buses) 51, 52 and 53. Thus, the PCI bridge module 40A connects the disk interface module 10A, the host interface module 20A and the management module 30 to one another so that data can be transferred among them.

The PCI bridge module 40A has a function being as a confirmation code setting means 41 similar to that described hereinbefore. When the interface module 10A or 20A transfers data to the management module 30 via the PCI bridge module 40A through the PCI buses 51 or 52, and 53, the confirmation code setting means 41 sets, in the PCI bridge module 40A, a confirmation code (AA code) for confirming data transfer from the PCI bridge module 40A to the management module 30. The interface module 10A or 20A reads out the above confirmation code from the PCI bridge module 40A after the data transfer, determines whether or not the data transfer from the PCI bridge module 40A to the management module 30 has been normally carried out, and carries out a process according to a result of the determination (normal end or data re-transfer).

The PCI bridge module 40A according to this embodiment newly has a function of storing and retaining an address of an error when the error occurs during data transfer between the PCI bridge module 40A and the management module 30.

In the storage controlling apparatus 3A with the above structure according to this embodiment, data writing from the server 4 to one of the disk units 2a and data reading from one of the disk units 2a to the server 4 are carried out in procedures similar to those performed in the known storage controlling apparatus 3 (refer to arrows A1 through A4 in FIG. 4).

Next, description will be made of structures of the disk interface module 10A and the host interface module 20A in the storage controlling apparatus 3A according to this embodiment with reference to a block diagram shown in FIG. 1. The disk interface module 10A and the host interface module 20A have basically the same structure. However, the host interface module 20A differs from the disk interface module 10A in that the host interface module 20A has a function of converting an optical signal from the fiber channel interface bus 50 into an electric signal, and a function of an electric signal in the host interface module 20A into an optical signal and sending the optical signal to the fiber channel interface bus 50, while the disk interface module 10A does not have these functions.

Figure 1:
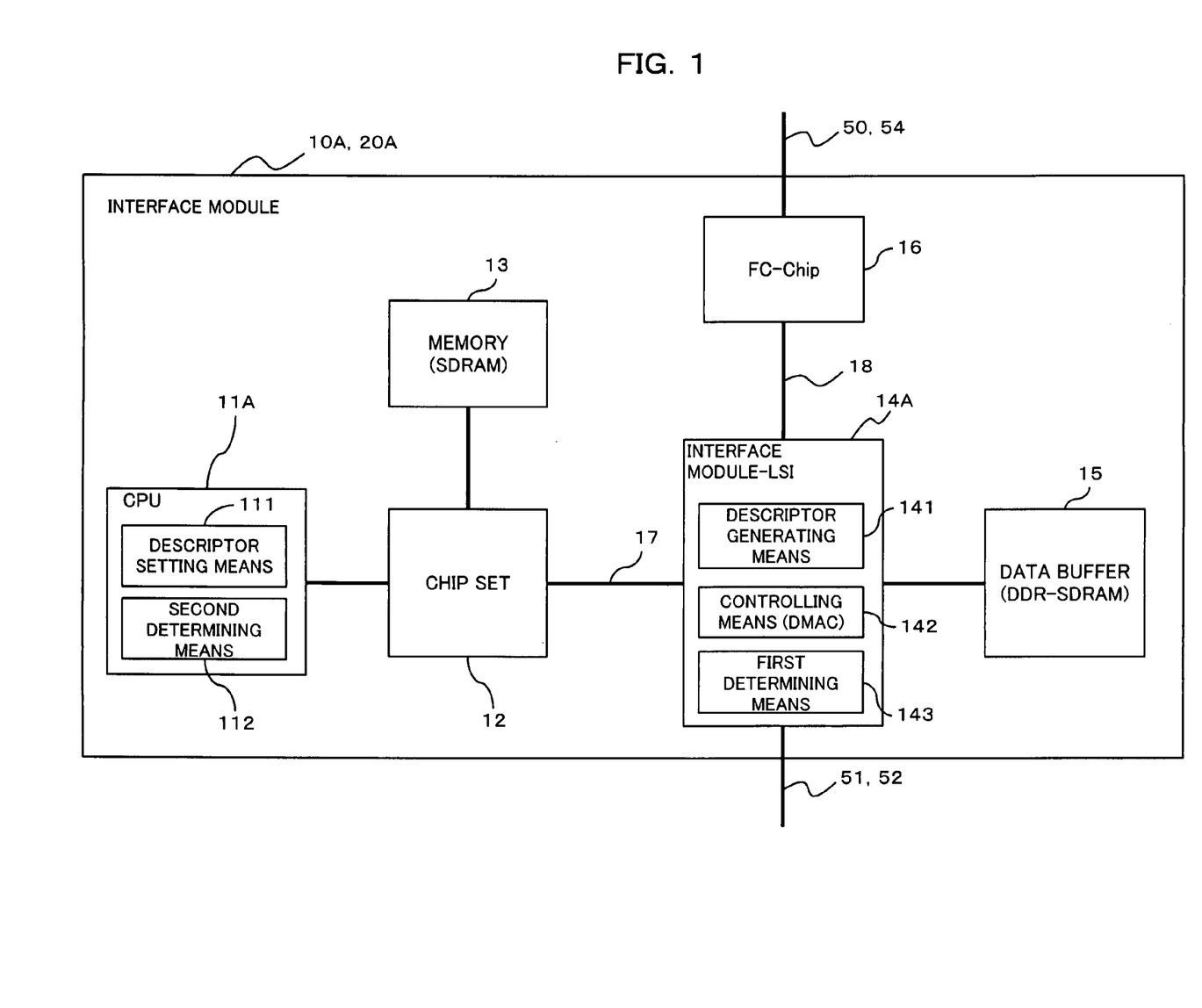
FIG. 1 is a block diagram showing a structure of an interface module for a storage controlling apparatus according to an embodiment of this invention.

As shown in FIG. 1, each of the disk interface module 10A and the host interface module 20A (hereinafter simply referred as interface modules 10A and 20A) comprises a CPU 11A, a chip set 12, a memory 13, an interface module-LSI 14A, a data buffer 15 and a fiber channel chip 16.

The CPU (Central Processing Unit) 11A functions as a first processing unit generally managing the interface module 10A or 20A. According to this embodiment, the CPU 11A also fulfills functions as a descriptor setting means 111 and a second determining means 112.

The descriptor setting means 111 sets, in a DMAC (a controlling means 142) in the interface module-LSI 14A, a descriptor for data transfer (data transfer descriptor) containing transfer information required to transfer data to the management module 30 and a data transfer confirmation flag for each data unit (data block) to be transferred.

Here, the descriptor (DSC) has a set of information required for DMA transfer. In a descriptor for data transfer, there are described data length, transfer origin address, transfer destination address and other additional information, for example, as transfer information required for data transfer to the management module 30. As another information, there is set the above data transfer confirmation flag, which is set to "ON" (set "1") when the interface module-LSI 14A is instructed to automatically generate a descriptor for confirmation code reading (data transfer confirmation descriptor) to be described later.

According to this embodiment, when a plurality of data blocks (data units) are successively transferred from the interface module 10A or 20A to the management module 30, the descriptor setting means 111 sets only a data transfer confirmation flag in a descriptor for data transfer for transferring the last data block among these data blocks to "ON" because the PCI bridge module 40A has the above new function (a function of storing and retaining of the address of an error when the error occurs during data transfer between the PCI bridge module 40A and the management module 30).

The second determining means 112 determines on the basis of a status read out from the interface module-LSI 14A whether data transfer between the interface module 10A or 20A and the PCI bridge module 40A has been carried out normally or abnormally, as will be described later with reference to FIGS. 2 and 3.

When the second determining means 112 determines that the data transfer has been carried out abnormally, the CPU 11A obtains, from the interface module-LSI 14A, detailed error information read out from the PCI bridge module 40A by the interface module-LSI 14A, and instructs the interface module-LSI 14A to re-transfer the data on the basis of the detailed error information. Namely, the descriptor setting means 111 functions so as to set, in the interface module-LSI 14A, a descriptor for data transfer for a data block to be re-transferred.

The chip set 12 has a function of connecting the CPU 11A to another device (for example, the memory 13) and a function of connecting the CPU 11A to the PCI bus 17. The CPU 11A is connected to the memory 13 via the chip set 12, and is further connected to the interface module-LSI 14A via the chip set 12 through the PCI bus 17. Incidentally, the memory 13 is configured with an SDRAM (Synchronous Dynamic Random Access Memory), for example.

The interface module-LSI (Large Scale Integration) 14A functions as a second processing unit (a second transfer processing unit) controlling data transfer between the interface module 10A or 20A and the PCI bridge module 30 through the PCI bus 51 or 52 according to an instruction from the CPU 11A. The interface module-LSI 14A is provided with the data buffer 15. The data buffer 15 is configured with a DDR (Double Data Rate)-SDRAM, for example, which temporarily stores data to be transferred to the PCI bridge module 40A or data transferred from the PCI bridge module 40A.

To the interface module-LSI 14A, the PCI bridge module 40A is connected through the PCI bus 51 or 52, the chip set 12 is connected through the PCI bus (interface bus) 17, and the fiber channel chip 16 is connected through the PCI bus (interface bus) 18.

The interface module-LSI 14A according to this embodiment has functions as a descriptor generating means 141, a controlling means (DMAC: Direct Memory Access Controller) 142 and a first determining means 143.

When the above data transfer confirmation flag in a descriptor for data transfer is "ON" ("1"), the descriptor generating means 141 automatically generates a descriptor for confirmation code reading (a data transfer confirmation descriptor) containing confirmation code reading information required to read the above confirmation code (AA code) from the PCI bridge module 40A to the interface module 10A or 20A on the basis of transfer information in a descriptor for data transfer set by the descriptor setting means 111 in the CPU 11A, and sets the descriptor for confirmation code reading in the controlling means (DMAC) 142. An address in the PCI bridge module 40A of the confirmation code (AA code) described in the descriptor for confirmation code reading is determined on the basis of the data transfer destination address.

The controlling means 142 functions as a DMAC. The controlling means 142 controls data transfer to the management module 30 according to a descriptor for data transfer (the above transfer information) set by the descriptor setting means 111 in the CPU 11A. The controlling means 142 also controls reading of a confirmation code (AA code) from the PCI bridge module 40A according to the above confirmation code reading information in the above descriptor for confirmation code reading automatically generated by the descriptor generating means 141 after the data transfer to the management module 30 is completed when the above data transfer confirmation flag in the descriptor for data transfer is "ON" ("1").

The first determining means 143 determines on the basis of the above confirmation code read out from the PCI bridge module 40A whether data transfer between the PCI bridge module 40A and the management module 30 has been carried out normally or abnormally.

When the first determining unit 143 determines that the data transfer has been carried out abnormally, the descriptor generating means 141 automatically generates a descriptor for error reading (error reading descriptor) containing error reading information required to read out detailed error information (error address) from the PCI bridge module 40A to the interface module 10A or 20A, and the controlling means 142 controls reading of the above detailed error information from the PCI bridge module 40A according to the descriptor for error reading (the above error reading information) automatically generated by the descriptor generating means 141.

The fiber channel chip (FC-Chip) 16 functions as a first transfer processing unit controlling data transfer between the interface module 10A or 20A and a disk unit 2a or the server 4 through the fiber channel interface bus 50 or 54.

Next, detailed description will be made of an operation of the storage controlling apparatus 3A (interface module 10A or 20A) with the above structure according to this embodiment, with reference to FIGS. 2 and 3.

First, description will be made of an operation of the above storage controlling apparatus 3A at the time of normal data transfer with reference to a sequence diagram (steps S51 through S73) shown in FIG. 2. When starting data transfer, the CPU 11A sets the above descriptors for data transfer for respective data units (data blocks) to be transferred in the controlling means (DMAC) 142 in the interface module-LSI 14A by means of the function being as the descriptor setting means 111 (set DSCs; step S51), and starts the DMA (step S52).

Figure 2:
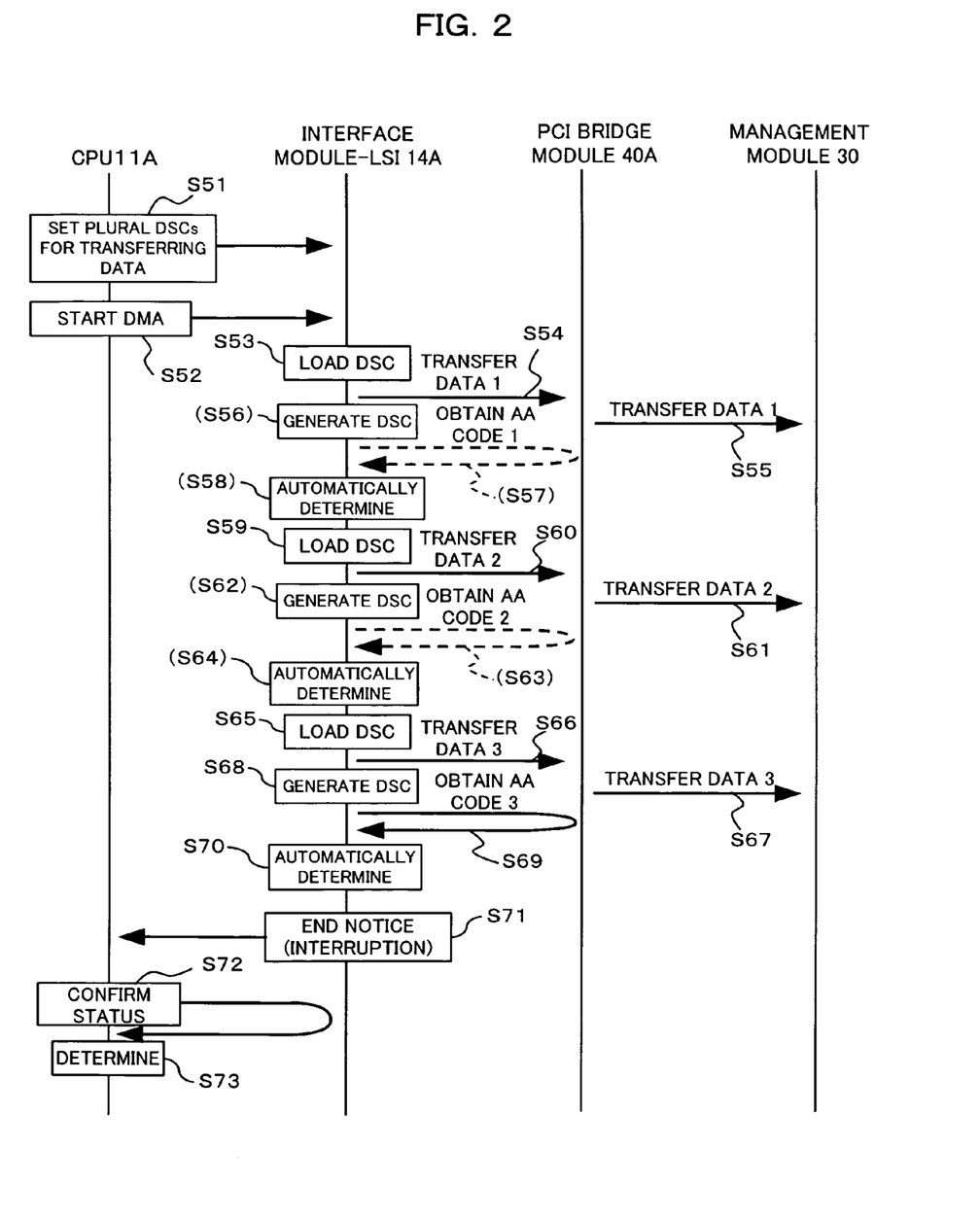
FIG. 2 is a sequence diagram for illustrating an operation of the storage controlling apparatus at the time of normal data transfer according to the embodiment of this invention.
Figure 3:
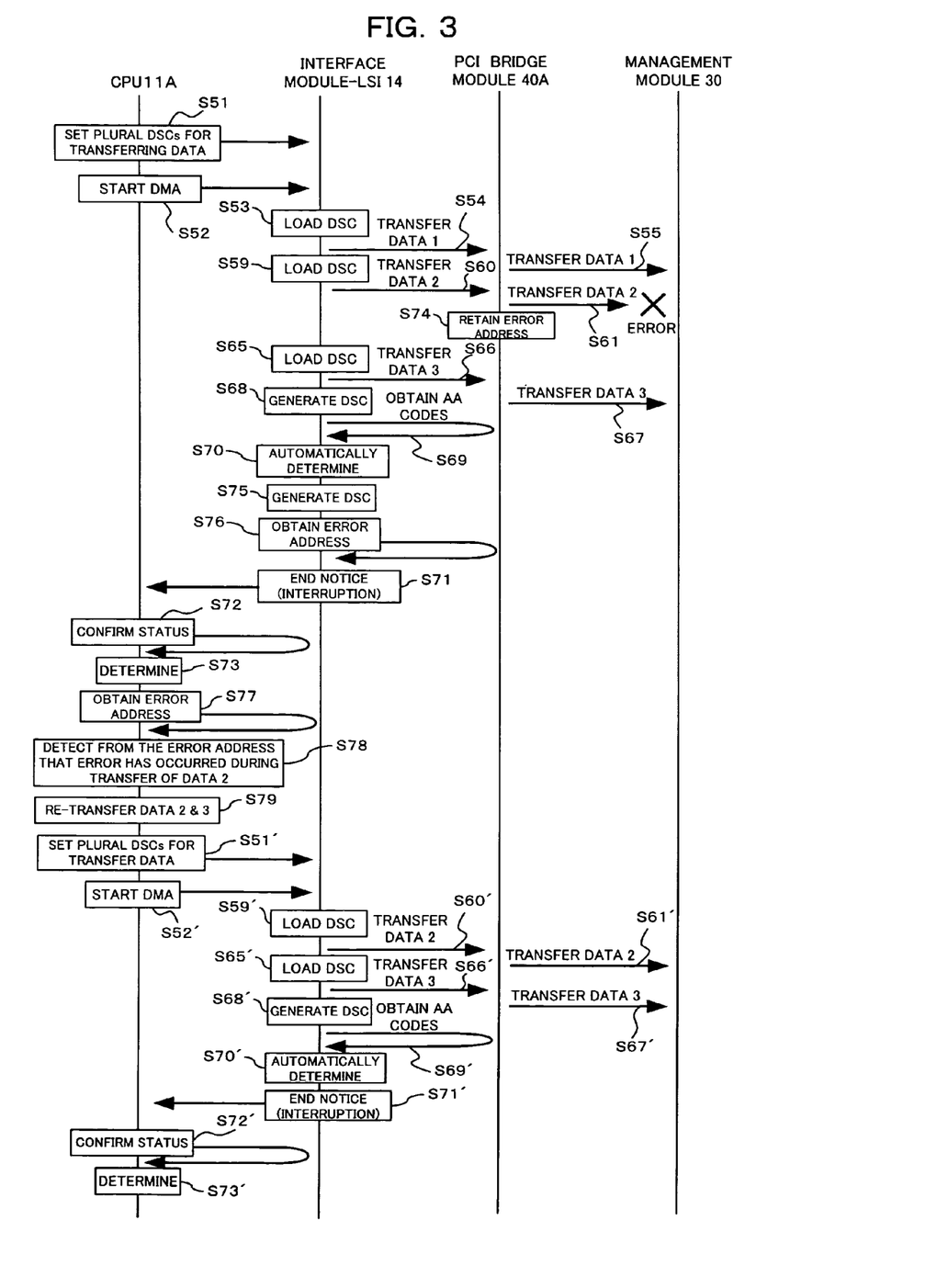
FIG. 3 is a sequence diagram for illustrating an operation of the storage controlling apparatus at the time of abnormal data transfer according to the embodiment of this invention.

In the example shown in FIGS. 2 and 3, three data units (data 1, 2 and 3) are successively transferred like the example shown in FIGS. 6 and 7. In this case, three descriptors for data transfer are set at step S51. At this time, the above data transfer confirmation flag is set as additional information in each of the descriptors for data transfer. When the PCI bridge module 40A has the above new function according to this embodiment, only a data transfer confirmation flag in a descriptor for data transfer for transferring the last data unit (data 3) among the above three data units is set to "ON" ("1"), and data transfer confirmation flags in descriptors for data transfer for transferring the other data units (data 1 and 2) are set to "OFF" ("0"), as described above. When the PCI bridge module 40A does not have the above new function, data transfer confirmation flags in all descriptors for data transfer for transferring the data units are set to "ON" ("1").

FIG. 2 shows both of a process executed when a data transfer confirmation flag in a descriptor for transferring the last data is set to "ON" ("1"), and a process executed when data transfer confirmation flags in all the descriptors for data transfer are set to "ON" ("1") However, processes at steps S56, S57, S58, S62, S63 and S64 among processes shown in FIG. 2 are executed only when data transfer confirmation flags in all the descriptors for data transfer are set to "ON" ("1"), but are omitted when only a data transfer confirmation flag in a descriptor for transferring the last data is set to "ON" ("1"). FIG. 3 shows only processes executed when a data transfer confirmation flag in a descriptor for transferring the last data is set to "ON" ("1").

In the interface module-LSI 14A in which the descriptor for data transfer is set and the DMA is started by the CPU 11A, the descriptors for data transfer are loaded for respective data units (load DSC; steps S53, S59 and S65). The data units are successively transferred from the interface module-LSI 14A to the management module 30 via the PCI bridge module 40A according to the loaded descriptors for data transfer by means of the function being as the controlling means (DMAC) 142 (steps S54, S55, S60, S61, S66 and S67).

When transfer of each of the data units is completed, a data transfer confirmation flag in the descriptor for data transfer is checked. When the flag is set to "ON" ("1"), a descriptor for confirmation code reading is automatically generated on the basis of transfer information in the descriptor for data transfer set by the descriptor setting means 111 in the CPU 11A by means of the function being as the descriptor generating means 141, and set in the controlling means (DMAC) 142 (generate DSC; steps S56, S62 and S68). (A) confirmation code(s) (all AA codes 1, 2 and 3, or only AA code 3) is obtained from the PCI bridge module 40A according to the automatically generated descriptor(s) for confirmation code reading by means of the function being as the controlling means (DMAC) 142 (steps S57, S63 and S69). It is then automatically determined on the basis of the confirmation code(s) obtained from the PCI bridge module 40A by means of the function being as the first determining means 143 whether the data transfer between the PCI bridge module 40A and the management module 30 has been carried out normally or abnormally (steps S58, S64 and S70). The sequence diagram shown in FIG. 2 shows an operation of the storage controlling apparatus 3A performed when the data transfer has been carried out normally, wherein determination of whether the data transfer has been carried out normally or abnormally is carried out at all the steps S58, S64 and S70, or only the step S70.

When transfer of the three data units is completed as above, an end notice (interruption) is sent from the interface module-LSI 14A to the CPU 11A (step S71). When receiving the end notice, the CPU 11A reads out a status from the interface module-LSI 14A (step S72). It is then determined on the basis of the read status by means of the function being as the second determining means 112 whether the data transfer between the interface module 10A or 20A and the PCI bridge module 40A has been carried out normally or abnormally (step S73). As described above, the sequence diagram shown in FIG. 2 shows the operation of the storage controlling apparatus 3A performed when the data transfer has been carried out normally, wherein the determination of whether the data transfer has been carried out normally or abnormally is carried out at step S73, and a series of data transfer is completed.

Next, description will be made of an operation of the above storage controlling apparatus 3A at the time of abnormal data transfer, with reference to a sequence diagram shown in FIG. 3. In FIG. 3, steps designated by like or corresponding reference characters are steps at which like or corresponding processes are executed, detailed descriptions of which are thus omitted. In FIG. 3, a reference character attached "'" designates a step at which data is re-transferred.

In the example shown in FIG. 3, three data units are transferred and a confirmation code of the last data unit is obtained in a procedure (steps S51 through S55, S59 through S61 and S65 through S70) similar to that shown in FIG. 2. In the example shown in FIG. 3, a transfer error occurs between the PCI bridge module 40A and the management module 30 when the second data 2 is transferred, and the transfer of the data 2 is terminated abnormally, like the example shown in FIG. 7. When such abnormality (an error) occurs, the PCI bridge module 40A according to this embodiment retains an address of the error by means of the above new function (step S74).

When the interface module-LSI 14A recognizes on the basis of a confirmation code obtained from the PCI bridge module 40A by means of the function being as the first determining means 143 that the data transfer between the PCI bridge module 40A and the management module 30 has been terminated abnormally (step S70), a descriptor for error reading is automatically generated by means of the function being as the descriptor generating means 141, and is set in the controlling means (DMAC) 142 (generate DSC; step S75). Then, detailed error information (error address) is read out from the PCI bridge module 40A according to the descriptor for error reading by means of the function being as the controlling means (DMAC) 142 (step S76).

When obtaining an error address as above, the interface module-LSI 14A sends an end notice (interruption) to the CPU 11A (step S71). When receiving the end notice, the CPU 11A reads out a status from the interface module-LSI 14A (step S72), and determines on the basis of the read status by means of the function being as the second determining means 112 whether the data transfer between the interface module 10A or 20A and the PCI bridge module 40A has been carried out normally or abnormally (step S73). Here, it is detected that a transfer error has occurred and determined that the data transfer has been carried out abnormally. Following that, the CPU 11A reads out an error address obtained at the step S76 from the interface module-LSI 14A (step S77), and recognizes on the basis of the error address that an error has occurred during transfer of data 2 (step S78).

According to a result of the recognition, the CPU 11A executes re-transfer of the second and later data units (here, two data 2 and 3) (step S79). When re-transferring, the CPU 11A sets descriptors for data transfer for the two data 2 and 3 to be re-transferred in the controlling means (DMAC) 142 in the interface module-LSI 14A by means of the function being as the descriptor setting means 111 (step S51'), and starts the DMA (step S52'). In a procedure similar to the procedure (steps S59 through S61 and S65 through S70) shown in FIG. 2, the data 2 and 3 are transferred, and a confirmation code (AA code 3) is obtained and automatically determined (steps S59' through S61', and S65' through S70').

When transfer of the two data units is completed as above, a processes similar to the processes at steps S71 through S73 (end notice, reading of a status, normality/abnormality determination; steps S71' through S73') are executed. When it is determined at step S73' that the data transfer has been carried out normally, a series of data transfer is completed.

In the storage controlling apparatus 3A (the interface module 10A or 20A) according to the embodiment of this invention, when the data transfer confirmation flag set in the descriptor for data transfer is "ON" ("1"), a descriptor for data transfer confirmation is automatically generated on the basis of transfer information in the descriptor for data transfer by means of the function being as the descriptor generating means 141 in the interface module-LSI 14A, and data transfer to the management module 30 is carried out according to the descriptor for data transfer. After the data transfer to the management module 30 is completed, a confirmation code is read out from the PCI bridge module 40A according to the descriptor for data transfer confirmation. It is thereby possible to omit a process of setting a descriptor for reading a confirmation code, which is heretofore carried out in the CPU 11. Accordingly, it becomes possible to largely reduce the load on the CPU 11A, largely decrease the number of PCI accesses, and largely improve the input/output performance.

The functions being as the two determining means 112 and 143 for determining whether data transfer have been carried out normally or abnormally are accomplished by the CPU (the first processing unit) 11A and the interface module-LSI (the second processing unit) 14A, respectively. When an error occurs, a descriptor for error reading is automatically generated by means of the function being as the descriptor generating means 141 in the interface module-LSI 14A, and detailed error information (an error address) is read out from the PCI bridge module 40A according to the above error reading descriptor, whereby it is possible to collect an abnormal status when normality of data transfer is confirmed without a load on the program. Accordingly, it becomes possible to further reduce the load on the CPU 11A, decrease the number of PCI accesses, and improve the input/output performance.

Note that the present invention is not limited to the above embodiment, but may be modified in various ways without departing from the scope of the invention.

In the above embodiment, the present invention is applied to a storage controlling apparatus, but the present invention is not limited to this example. For instance, the present invention can be applied to an apparatus so long as the apparatus comprises a plurality of modules connected to each other/one another through (an) interface bus(es) such as (a) PCI bus(es) or the like and has a function of confirming data transfer between/among these modules, and can provide the same functions and effects as the above embodiment.

In the above embodiment, the interface between the server 4 and the storage controlling apparatus 3A is a fiber channel interface, but the present invention is not limited to this example.

The functions being as the descriptor setting means 111, the second determining means 112, the descriptor generating means 141, the controlling means 142 and the first determining means 143 are accomplished by running a predetermined program by the CPU 11A and the interface module-LSI 14A. This program is provided in a form in which the program is recorded on a computer readable record medium such as a flexible disk, a CD-ROM, a CD-R, a CD-RW, a DVD or the like.

According to the present invention, a descriptor for data transfer confirmation can be automatically generated and data transfer confirmation is executed with a data transfer confirmation flag. It is thereby possible to omit a process of setting a descriptor for reading a confirmation code, which is heretofore carried out, largely reduce the load on the CPU, largely decrease the number of PCI accesses, and largely improve the input/output performance.

Therefore, the present invention is suitable for use in a storage controlling apparatus controlling an access to a physical device (a magnetic disk units or the like) from a host, for example, and an interface module for the apparatus, and its usefulness is extremely large.

What is claimed is:

1. An apparatus having an inter-module data transfer confirming function comprising:
   a first module;
   a second module;
   a bridge module connected to said first module and to said second module through interface buses to connect said first module and said second module to each other so that data can be transferred between said first module and said second module; and
   a confirmation code setting means for setting, in said bridge module, a confirmation code for confirming data transfer from said bridge module to said second module when said first module transfers data to said second module via said bridge module through said interface buses;
   said first module comprising:
      a descriptor setting means for, before data transfer is initiated, setting a data transfer descriptor containing transfer information required for data transfer to said second module and a data transfer confirmation flag set to ON when necessary to confirm the data transfer after the data transfer;
      a descriptor generating means for, after the data transfer to said second module, automatically generating, when said data transfer confirmation flag is ON, a data transfer confirmation descriptor containing confirmation code reading information, which is required to read said confirmation code from said bridge module to said first module, based upon said transfer information in said data transfer descriptor set by said descriptor setting means; and
      a controlling means for controlling data transfer to said second module according to said transfer information in said data transfer descriptor set by said descriptor setting means, and for controlling, when said data transfer confirmation flag is ON, after the data transfer to said second module is completed, reading of said confirmation code from said bridge module according to said confirmation code reading information in said data transfer confirmation descriptor automatically generated by said descriptor generating means.

2. The apparatus having an inter-module data transfer confirming function according to claim 1, wherein said first module comprises:
   a first processing unit for generally managing said first module;
   a second processing unit for carrying out data transfer through said interface buses according to an instruction from said first processing unit;
   said first processing unit fulfilling a function as said descriptor setting means; and said second processing unit fulfilling functions as said descriptor generating means and said controlling means.

3. The apparatus having an inter-module data transfer confirming function according to claim 1, wherein said first module further comprises:
a first determining means for determining whether data transfer between said bridge module and said second module has been carried out normally or abnormally, on the basis of said confirmation code read out from said bridge module; and
a second determining means for determining whether data transfer between said first module and said bridge module has been carried out normally or abnormally.

4. The apparatus having an inter-module data transfer confirming function according to claim 3, wherein when said first determining means determines that the data transfer has been carried out abnormally, said descriptor generating means automatically generates an error reading descriptor containing error reading information required to read out detailed error information from said bridge module to said first module, and said controlling means controls reading of said detailed error information from said bridge module according to said error reading information in said error reading descriptor automatically generated by said descriptor generating means.

5. The apparatus having an inter-module data transfer confirming function according to claim 4, wherein said first module comprises:
a first processing unit for generally managing said first module;
a second processing unit for carrying out data transfer through said interface buses according to an instruction from said first processing unit;
said first processing unit fulfilling functions as said descriptor setting means and said
second determining means; and
said second processing unit fulfilling functions as said descriptor generating means, said controlling means and said first determining means.

6. The apparatus having an inter-module data transfer confirming function according to claim 5, wherein when said second determining means determining that the data transfer has been carried out abnormally, said first processing unit obtains, from said second processing unit, said detailed error information read out from said bridge module, and instructs said second processing unit to re-transfer the data on the basis of said detailed error information.

7. The apparatus having an inter-module data transfer confirming function according to claim 1, wherein when a plurality of data blocks are successively transferred from said first module to said second module, said descriptor setting means sets only said data transfer confirmation flag in a data transfer descriptor for transferring the last data block among said plurality of data blocks to ON.

8. The apparatus having an inter-module data transfer confirming function according to claim 2, wherein when a plurality of data blocks are successively transferred from said first module to said second module, said descriptor setting means sets only said data transfer confirmation flag in a data transfer descriptor for transferring the last data block among said plurality of data blocks to ON.

9. The apparatus having an inter-module data transfer confirming function according to claim 3, wherein when a plurality of data blocks are successively transferred from said first module to said second module, said descriptor setting means sets only said data transfer confirmation flag in a data transfer descriptor for transferring the last data block among said plurality of data blocks to ON.

10. The apparatus having an inter-module data transfer confirming function according to claim 4, wherein when a plurality of data blocks are successively transferred from said first module to said second module, said descriptor setting means sets only said data transfer confirmation flag in a data transfer descriptor for transferring the last data block among said plurality of data blocks to ON.

11. The apparatus having an inter-module data transfer confirming function according to claim 5, wherein when a plurality of data blocks are successively transferred from said first module to said second module, said descriptor setting means sets only said data transfer confirmation flag in a data transfer descriptor for transferring the last data block among said plurality of data blocks to ON.

12. The apparatus having an inter-module data transfer confirming function according to claim 6, wherein when a plurality of data blocks are successively transferred from said first module to said second module, said descriptor setting means sets only said data transfer confirmation flag in a data transfer descriptor for transferring the last data block among said plurality of data blocks to ON.

13. A storage controlling apparatus disposed between a disk unit and a host to control an access to said disk unit from said host, said storage controlling apparatus comprising:
a disk interface module for controlling an interface with said disk unit
a host interface module for controlling an interface with said host;
a management module for generally managing said apparatus;
a bridge module connected to said disk interface module, said host interface module and said management module through interface buses to connect said disk interface module, said host interface module and said management module to one another so that data can be transferred among said disk interface module, said host interface module and said management module; and
a confirmation code selling means for setting, in said bridge module, a confirmation code for confirming data transfer from said bridge module to said management module when said disk interface module or said host interface module transfers data to said management module via said bridge module through said interface buses;
said disk interface module and/or said host interface module (hereinafter referred simply as said interface module) comprising:
a descriptor setting means for, before data transfer is initiated, setting a data transfer descriptor containing transfer information required for data transfer to said management module and a data transfer confirmation flag set to ON when necessary to confirm the data transfer after the data transfer;
a descriptor generating means for, after the data transfer to said management module automatically generating, when said data transfer confirmation flag is ON, a data transfer confirmation descriptor containing a confirmation code reading information, which is required to read said confirmation code from said bridge module to said interface module, based upon said transfer information in said data transfer descriptor set by said descriptor setting means; and
a controlling means for controlling data transfer to said management module according to said transfer information in said data transfer descriptor set by said descriptor setting means, and for controlling, when said data transfer confirmation flag is ON, after the data transfer to said management module is completed, reading of said confirmation code from said bridge module according to said confirmation code reading information in said data transfer confirmation descriptor automatically generated by said descriptor generating means.

14. The storage controlling apparatus according to claim 13, wherein said interface module comprises:
   a first processing unit for generally managing said interface module;
   a second processing unit for carrying out data transfer through said interface buses according to an instruction from said first processing unit;
   said first processing unit fulfilling a function as said descriptor selling means; and
   said second processing unit fulfilling functions as said descriptor generating means and said controlling means.

15. The storage controlling apparatus according to claim 13, wherein said interface module comprises:
   a first determining means for determining, on the basis of said confirmation code read out from said bridge module, whether data transfer between said bridge module and said management module has been carried out normally or abnormally; and
   a second determining means for determining whether data transfer between said interface module and said bridge module has been carried out normally or abnormally.

16. The storage controlling apparatus according to claim 15, wherein when said first determining means determines that the data transfer has been carried out abnormally, said descriptor generating means automatically generates an error reading descriptor containing error reading information required to read out detailed error information from said bridge module to said interface module, and said controlling means controls reading of said detailed error information from said bridge module according to said error reading information in said error reading descriptor automatically generated by said descriptor generating means.

17. The storage controlling apparatus according to claim 16, wherein said interface module comprises:
   a first processing unit for generally managing said interface module
   a second processing unit for carrying out data transfer through said interface buses according to an instruction from said first processing unit;
   said first processing unit fulfilling functions as said descriptor setting means and said second determining unit; and
   said second processing unit fulfilling functions as said descriptor generating means, said controlling means and said first determining means.

18. The storage controlling apparatus according to claim 17, wherein when said second determining unit determines that the data transfer has been carried out abnormally, said first processing unit obtains, from said second processing unit, said detailed error information read out from said bridge module, and instructs said second processing unit to re-transfer the data on the basis of said detailed error information.

19. The storage controlling apparatus according to claim 13, when a plurality of data blocks are successively transferred from said interface module to said management module, said descriptor setting means sets only said data transfer confirmation flag in a data transfer descriptor for transferring the last data block among said plurality of data blocks to ON.

20. The storage controlling apparatus according to claim 14, when a plurality of data blocks are successively transferred from said interface module to said management module, said descriptor setting means sets only said data transfer confirmation flag in a data transfer descriptor for transferring the last data block among said plurality of data blocks to ON.

21. The storage controlling apparatus according to claim 15, when a plurality of data blocks are successively transferred from said interface module to said management module, said descriptor setting means sets only said data transfer confirmation flag in a data transfer descriptor for transferring the last data block among said plurality of data blocks to ON.

22. The storage controlling apparatus according to claim 16, when a plurality of data blocks are successively transferred from said interface module to said management module, said descriptor setting means sets only said data transfer confirmation flag in a data transfer descriptor for transferring the last data block among said plurality of data blocks to ON.

23. The storage controlling apparatus according to claim 17, when a plurality of data blocks are successively transferred from said interface module to said management module, said descriptor setting means sets only said data transfer confirmation flag in a data transfer descriptor for transferring the last data block among said plurality of data blocks to ON.

24. The storage controlling apparatus according to claim 18, when a plurality of data blocks are successively transferred from said interface module to said management module, said descriptor setting means sets only said data transfer confirmation flag in a data transfer descriptor for transferring the last data block among said plurality of data blocks to ON.

25. An interface module for a storage controlling apparatus disposed between a disk unit and a host to control an access from said host to said disk unit, said storage controlling apparatus comprising said interface module for controlling an interface with said disk unit or said host, a management module for generally managing e said storage controlling apparatus, a bridge module connected to said interface module and to said management module through interface buses to connect said interface module and said management module to each other so that data can be transferred between said interface module and said management module, and a confirmation code setting means for setting, in said bridge module, a confirmation code for confirming data transfer from said bridge module to said management module when said interface module transfers data to said management module via said bridge module through said interface buses, said interface module comprising:
   a descriptor setting means for, before data transfer is initiated, setting a data transfer descriptor containing transfer information required for data transfer to said management module and a data transfer confirmation flag set to ON when necessary to confirm the data transfer after the data transfer;
   a descriptor generating means for, after the data transfer to said management module, automatically generating, when said data transfer confirmation flag is ON, a data transfer confirmation descriptor containing confirmation code reading information, which is required to read said confirmation code from said bridge module to said interface module, based upon said transfer information in said data transfer descriptor set by said descriptor setting means; and a controlling means for controlling data transfer to said management module according to said transfer information in said data transfer descriptor set by said descriptor setting means, and for controlling, when said data transfer confirmation flag is ON, after the data transfer to said management module is competed, reading of said confirmation code from said bridge module according to said confirmation code reading information in said data transfer confirmation descriptor automatically generated by said descriptor generating means.

26. The interface module for a storage controlling apparatus according to claim 25 comprising:
a first processing unit for generally managing said interface module;
a second processing unit for carrying out data transfer through said interface buses according to an instruction from said first processing unit;
said first processing unit fulfilling a function as said descriptor generating means; and
said second processing unit fulfilling functions as said descriptor generating means and said controlling means.

27. The interface module for a storage controlling apparatus according to claim 25 further comprising:
a first determining means for determining whether data transfer between said bridge module and said management module has been carried out normally or abnormally, on the basis of said confirmation code read out from said bridge module; and
a second determining means for determining whether data transfer between said interface module and said bridge module has been carried out normally or abnormally.

28. The interface module for a storage controlling apparatus according to claim 27, wherein when said first determining unit determines that the data transfer has been carried out abnormally, said descriptor generating means automatically generates an error reading descriptor containing error reading information required to read out detailed error information from said bridge module to said interface module, and said controlling means controls reading of said detailed error information from said bridge module according to said error reading information in said error reading descriptor automatically generated by said descriptor generating means.

29. The interface module for a storage controlling apparatus according to claim 28 comprising:
a first processing unit for generally managing said interface module;
a second processing unit for carrying out data transfer through said interface buses according to an instruction from said first processing unit;
said first processing unit fulfilling functions as said descriptor setting means and said second determining unit; and
said second processing unit fulfilling functions as said descriptor generating means, said controlling means and said first determining means.

30. The interface module for a storage controlling apparatus according to claim 29, wherein when said second determining means determines that the data transfer has been carried out abnormally, said first processing unit obtains, from said second processing unit, said detailed error information read out from said bridge module, and instructs said second processing unit to re-transfer the data on the basis of said detailed error information.

31. The interface module for a storage controlling apparatus according to claim 25, wherein when a plurality of data blocks are successively transferred from said interface module to said management module, said descriptor setting means sets only said data transfer confirmation flag in a data transfer descriptor for transferring the last data block among said plurality of data blocks to ON.

32. The interface module for a storage controlling apparatus according to claim 26, wherein when a plurality of data blocks are successively transferred from said interface module to said management module, said descriptor setting means sets only said data transfer confirmation flag in a data transfer descriptor for transferring the last data block among said plurality of data blocks to ON.

33. The interface module for a storage controlling apparatus according to claim 27, wherein when a plurality of data blocks are successively transferred from said interface module to said management module, said descriptor setting means sets only said data transfer confirmation flag in a data transfer descriptor for transferring the last data block among said plurality of data blocks to ON.

34. The interface module for a storage controlling apparatus according to claim 28, wherein when a plurality of data blocks are successively transferred from said interface module to said management module, said descriptor setting means sets only said data transfer confirmation flag in a data transfer descriptor for transferring the last data block among said plurality of data blocks to ON.

35. The interface module for a storage controlling apparatus according to claim 29, wherein when a plurality of data blocks are successively transferred from said interface module to said management module, said descriptor setting means sets only said data transfer confirmation flag in a data transfer descriptor for transferring the last data block among said plurality of data blocks to ON.

36. The interface module for a storage controlling apparatus according to claim 30, wherein when a plurality of data blocks are successively transferred from said interface module to said management module, said descriptor setting means sets only said data transfer confirmation flag in a data transfer descriptor for transferring the last data block among said plurality of data blocks to ON.

* * * * *

UNITED STATES PATENT AND TRADEMARK OFFICE
CERTIFICATE OF CORRECTION

PATENT NO. : 7,152,129 B2
APPLICATION NO. : 10/785232
DATED : December 19, 2006
INVENTOR(S) : Tomoharu Muro It is certified that error appears in the above-identified patent and that said Letters Patent is hereby corrected as shown below:

Col. 18, line 29, after "unit" insert --;--

Col. 18, line 58, after "module" insert --,--

Col. 19, line 18, delete "selling" and insert --setting--

Col. 19, line 46, after "module" insert --;--

Col. 20, line 44, after "managing" delete "e"

Signed and Sealed this

Tenth Day of April, 2007

JON W. DUDAS
*Director of the United States Patent and Trademark Office*